(12) United States Patent
Zhang et al.

(10) Patent No.: US 11,591,765 B2
(45) Date of Patent: Feb. 28, 2023

(54) STRUCTURE AND METHOD FOR THREE-DIMENSIONAL RESTORATION OF SLOPE SOIL IN ABANDONED ION-ABSORBED RARE EARTH MINING AREA

(71) Applicant: Jiangxi Academy of Environmental Sciences, Jiangxi (CN)

(72) Inventors: Meng Zhang, Jiangxi (CN); Na Yao, Jiangxi (CN); Junwei Wu, Jiangxi (CN); Jiaqi Zhu, Jiangxi (CN); Binghao Wan, Jiangxi (CN); Min Zhou, Jiangxi (CN); Tao Wang, Jiangxi (CN); Bing Feng, Jiangxi (CN); Zugen Liu, Jiangxi (CN); Wangzhen Ni, Jiangxi (CN)

(73) Assignee: Jiangxi Academy of Environmental Sciences, Nanchang (CN)

( * ) Notice: Subject to any disclaimer, the term of this patent is extended or adjusted under 35 U.S.C. 154(b) by 295 days.

(21) Appl. No.: 17/095,346

(22) Filed: Nov. 11, 2020

(65) Prior Publication Data
US 2021/0141121 A1    May 13, 2021

(30) Foreign Application Priority Data

Nov. 13, 2019    (CN) .......................... 201911105944.4

(51) Int. Cl.
*B09C 1/00*    (2006.01)
*E02D 3/00*    (2006.01)
(Continued)

(52) U.S. Cl.
CPC ............... *E02D 3/00* (2013.01); *A01B 79/02* (2013.01); *A01C 7/18* (2013.01); *A01C 21/005* (2013.01);
(Continued)

(58) Field of Classification Search
CPC ....... E02D 3/00; B09C 1/105; B09C 2101/00; B09B 1/004; A01C 21/005
See application file for complete search history.

(56) References Cited

U.S. PATENT DOCUMENTS

| | | | |
|---|---|---|---|
| 4,462,713 A * | 7/1984 | Zurcher | B01D 61/025 210/170.07 |
| 7,718,063 B2 * | 5/2010 | Jacquet | B01D 53/85 210/170.08 |

(Continued)

*Primary Examiner* — Benjamin F Fiorello
(74) *Attorney, Agent, or Firm* — BakerHostetler; Toni-Junell Herbert

(57) ABSTRACT

A structure and method for three-dimensional restoration of slope soil in an abandoned ion-absorbed rare earth mining area, belonging to the field of ecological restoration technologies. The structure for three-dimensional restoration of slope soil in an abandoned ion-absorbed rare earth mining area provided by the present invention includes an ecological water-harvesting pond, ecological intercepting ditches, an improved soil layer laid on the surface of a to-be-restored slope region and a soil restoration ecological network disposed on the improved soil layer. The improved soil layer, the ecological water-harvesting pond and the ecological intercepting ditches are each provided with a combined plant synusia system. The restoration structure provided by the present invention can effectively improve an extremely degraded ecological environment of the abandoned ion-absorbed rare earth mining area caused by tailings waste land and restore the degraded or polluted mining area soil and environment caused by mine destruction during rare earth mining.

12 Claims, 2 Drawing Sheets

(51) Int. Cl.
*A01C 7/18* (2006.01)
*A01C 21/00* (2006.01)
*A01B 79/02* (2006.01)
*A01G 17/00* (2006.01)
*A01G 22/00* (2018.01)
*B09B 1/00* (2006.01)
*B09C 1/10* (2006.01)
*A01G 33/00* (2006.01)

(52) U.S. Cl.
CPC ........... *A01G 17/005* (2013.01); *A01G 22/00* (2018.02); *A01G 33/00* (2013.01); *B09B 1/004* (2013.01); *B09C 1/105* (2013.01); *B09C 2101/00* (2013.01)

(56) References Cited

U.S. PATENT DOCUMENTS

| | | | | |
|---|---|---|---|---|
| 8,864,412 | B2* | 10/2014 | Kunz | B09C 1/025 |
| | | | | 405/128.85 |
| 8,961,073 | B2* | 2/2015 | Dudding | E02D 17/202 |
| | | | | 405/272 |
| 10,086,417 | B2* | 10/2018 | James | C10L 1/026 |
| 10,638,674 | B2* | 5/2020 | Mueller | B09C 1/02 |
| 2012/0064263 | A1* | 3/2012 | Ayers | D06N 7/0092 |
| | | | | 428/221 |
| 2012/0201606 | A1* | 8/2012 | Dudding | E02D 17/18 |
| | | | | 405/129.6 |
| 2014/0037379 | A1* | 2/2014 | Ng | E02B 11/005 |
| | | | | 405/36 |
| 2015/0132060 | A1* | 5/2015 | Stehling | E02D 17/202 |
| | | | | 405/15 |
| 2021/0332534 | A1* | 10/2021 | Urrutia | B09B 1/004 |

* cited by examiner

STRUCTURE AND METHOD FOR THREE-DIMENSIONAL RESTORATION OF SLOPE SOIL IN ABANDONED ION-ABSORBED RARE EARTH MINING AREA

TECHNICAL FIELD

The present invention relates to the field of ecological restoration technologies, and in particular, to a structure and method for three-dimensional restoration of slope soil of an abandoned ion-absorbed rare earth mining area.

BACKGROUND

Rare earth elements, called "industrial gold", are important materials used in high-tech fields. Since the 1970s, the exploitation of ion-absorbed rare earth ore in southern Jiangxi Province has undergone three different technical processes: pond leaching (1970s-2000s), heap leaching (1980s-2000s) and in situ leaching (1990s up to now). The three technologies all have defects of destroying vegetation, causing soil erosion and being low in rare earth leaching rate and utilization rate of rare earth resources, etc. The former two technologies are extremely prominent in both destroying surface vegetation and causing soil erosion, which is called "mountain-moving movement". In addition, a large amount of $NH_4^+$ and $SO_4^{2-}$ remain in the soil or tailings of the mining area during rare earth extraction, resulting in obvious salinization and acidification of the soil, thereby resulting in massive "southern desert" type waste land in South China. Due to disordered mining and extensive industrial management in ion-absorbed rare earth mining areas and other reasons, a wide range of environmental pollution and severe ecological damage were caused in these areas over the past several decades. In addition to wasting a large number of rare earth resources, this also made abundant rare earth metals enter the aquatic environment of the mining areas. Under the dual effects of natural phenomena and human activities, the rare earth elements and the associated metal pollutants (e.g. Cd, Pb and Mn) are migrated, accumulated, transformed and diffused, causing impacts and potential hazards to the atmosphere, plants, aquatic ecosystems, surface soil and surrounding residents around the mining areas. Therefore, in view of destruction of the surrounding environment caused by the exploitation of ion-absorbed rare earth mines in South China, the implementation of soil restoration of wasteland and ecological restoration of the abandoned mines is of great practical significance for restoring the environment and protecting human health in these areas.

The soil in an abandoned ion-absorbed rare earth mining area usually features extremely poor soil matrix, texture, structure, fertility and water retention capacity, low organic matter content and clay content, soil acidification, large amount of salt residues, and lack of aggregates. As a result, soil erosion in abandoned rare earth mines in southern Jiangxi Province easily occurs during the rainstorm season of South China. Accordingly, there are a large number of abandoned slopes, unstable slope bodies, and bare surface and lack of vegetation, which cause serious geological disasters such as collapse and landslide.

At present, there is no special technology that can effectively realize slope restoration in abandoned ion-absorbed rare earth mining areas in South Jiangxi province, and such slope restoration has a large technical bottleneck and easily fails in engineering practice. At present, technologies for restoring other types of mining area slopes simply use plants, and the methods are relatively single or more suitable for arid and semi-arid areas. For example, the Chinese patent with the publication number CN103875481A discloses a component and method for restoring a mine slope, which achieve better restoring effects on a mine slope with complex terrain through a mesh-shaped frame and a restoration bag containing seeds, substrates and base fertilizers. The Chinese patent with the publication number CN103650968A discloses a device for pit planting of plants on a slope, which includes a conservation basket and a base bag and has better ecological restoration effects on bare surface in arid and semi-arid areas. The Chinese patent with the publication number CN105961120A discloses a method for rapid restoration of vegetation on ecological restoration slopes in arid areas, which is used to perform ecological restoration of mines in arid areas mainly based on slope protection, water collection devices, soil improvement and plant allocation and other aspects. However, the foregoing method is not applicable to the abandoned ion-absorbed rare earth mining areas in South China and cannot fundamentally solve the problem of how to perform slope restoration in the abandoned ion-absorbed rare earth mining areas in rainy areas in South China.

SUMMARY

The present invention provides a structure and method for three-dimensional restoration of slope soil of an abandoned ion-absorbed rare earth mining area. The restoration structure provided by the present invention can effectively improve an extremely degraded ecological environment of the abandoned ion-absorbed rare earth mining area caused by tailings waste land and improve the degraded or polluted mining area soil and environment caused by mine destruction during rare earth mining.

To achieve the above purpose, the present invention provides the following technical solutions.

The present invention provides a structure for three-dimensional restoration of slope soil in an abandoned ion-absorbed rare earth mining area, including an ecological water-harvesting pond, ecological intercepting ditches, an improved soil layer laid on the surface of a to-be-restored slope region and a soil restoration ecological network embedded in the improved soil layer;

the improved soil layer, the ecological water-harvesting pond and the ecological intercepting ditches are each provided with a combined plant synusia system;

the to-be-restored slope region is in a stair-step shape and includes a plurality of platform surfaces and a plurality of slope surfaces;

the ecological intercepting ditches each include a first slope surface ecological intercepting ditch, a second slope surface ecological intercepting ditch and a platform surface ecological intercepting ditch, where the first slope surface ecological intercepting ditch and the second slope surface ecological intercepting ditch are disposed on both sides of the slope surface respectively, the platform surface ecological intercepting ditches are disposed on an inner side and an outer side of the lowest platform surface close to a slope toe and inner sides of the remaining platform surfaces close to slope toes, both ends of the platform surface ecological intercepting ditch are connected to the first slope surface ecological intercepting ditch and the second slope surface ecological intercepting ditch respectively, and a bottom end of the first slope surface ecological intercepting ditch or the second slope surface ecological intercepting ditch is connected to the ecological water-harvesting pond.

Preferably, the platform surface has a width of 40-60 cm and an inward slope ratio of 3%-8%; and the slope surface has a length of 2-3 m.

Preferably, the soil restoration ecological network is composed of a plurality of soil-fixing devices, the soil-fixing devices are rectangular frames, and a width of each frame is 3-8 cm; and the soil restoration ecological network is formed by biological soil fixing materials prepared from agricultural wastes.

Preferably, the improved soil layer has a thickness of 20-30 cm.

Preferably, the improved soil layer is obtained by improving a soil layer on the surface of the to-be-restored slope region by using a modifier.

Preferably, the combined plant synusia system includes a slope surface combined plant synusia system, a platform surface combined plant synusia system, an ecological intercepting ditch combined plant synusia system and an ecological water-harvesting pond combined plant synusia system.

Preferably, the slope surface combined plant synusia system adopts an arbor-vine-shrub-herb combined synusia system, the platform surface combined plant synusia system adopts an arbor-shrub-herb combined synusia system, the ecological intercepting ditch combined plant synusia system adopts an algae-moss-fern combined synusia system, and the ecological water-harvesting pond combined plant synusia system adopts an oxidation pond aquatic plant system.

Preferably, the first slope surface ecological intercepting ditch and the second slope surface ecological intercepting ditch each have a width of 18-22 cm and a depth of 28-32 cm; and the platform surface ecological intercepting ditch has a width of 6-8 cm and a depth of 28-32 cm.

The present invention further provides a method for three-dimensional restoration of slope soil in an abandoned ion-absorbed rare earth mining area, including the following steps of:

trimming a to-be-restored slope region into a stair-step shape with a plurality of platform surfaces and a plurality of slope surfaces, where both sides of each slope surface are provided with a first slope surface ecological intercepting ditch and a second slope surface ecological intercepting ditch respectively, platform surface ecological intercepting ditches are disposed on an inner side and an outer side of the lowest platform surface close to a slope toe and inner sides of the remaining platform surfaces close to slope toes, both ends of the platform surface ecological intercepting ditch are connected to the first slope surface ecological intercepting ditch and the second slope surface ecological intercepting ditch respectively, and a bottom end of the first slope surface ecological intercepting ditch or the second slope surface ecological intercepting ditch is connected to the ecological water-harvesting pond;

laying an improved soil layer on the surface of the to-be-restored slope region and embedding a soil restoration ecological network in the improved soil layer; and planting plants in the ecological water-harvesting pond, the ecological intercepting ditches and the improved soil layer to form a combined plant synusia system.

Preferably, after the planting plants in the improved soil layer, the method further includes field moisture and fertilization management.

The present invention provides a structure for three-dimensional restoration of slope soil in an abandoned ion-absorbed rare earth mining area, including an ecological water-harvesting pond, ecological intercepting ditches, an improved soil layer laid on the surface of a to-be-restored slope region and a soil restoration ecological network disposed on the improved soil layer; the improved soil layer, the ecological water-harvesting pond and the ecological intercepting ditches are each provided with a combined plant synusia system; the to-be-restored slope region is in a stair-step shape and includes a plurality of platform surfaces and a plurality of slope surfaces; the ecological intercepting ditches each include a first slope surface ecological intercepting ditch, a second slope surface ecological intercepting ditch and a platform surface ecological intercepting ditch, where the first slope surface ecological intercepting ditch and the second slope surface ecological intercepting ditch are disposed on both sides of the slope surface respectively, the platform surface ecological intercepting ditches are disposed on an inner side and an outer side of the lowest platform surface close to a slope toe and inner sides of the remaining platform surfaces close to slope toes, both ends of the platform surface ecological intercepting ditch are connected to the first slope surface ecological intercepting ditch and the second slope surface ecological intercepting ditch respectively, and a bottom end of the first slope surface ecological intercepting ditch or the second slope surface ecological intercepting ditch is connected to the ecological water-harvesting pond. The restoration structure provided by the present invention can effectively improve an extremely degraded ecological environment of the abandoned ion-absorbed rare earth mining area caused by tailings waste land and restore the degraded or polluted mining area soil and environment caused by mine destruction during rare earth mining.

Further, the present invention solves the problem that soil erosion in slopes of abandoned ion-absorbed rare earth mines in rainy regions of South China is extremely serious and there is an urgent need for ecological restoration by fixing soil through soil improvement, slope surface protection, plant configuration, soil fixing biomass materials to prevent secondary pollution. Specifically, adding a modifier to barren soil for chemical improvement of soil can gradually restore soil functions, enhance the fixed planting survival and growth of plants in the soil of abandoned ion-absorbed rare earth mining areas, and improve the survival rate of plants. High ammonium resistant "algae-moss-fern-arbor-shrub-vine-herb" combined vegetation is adopted to form a technical system for vegetation restoration of a damaged slope of an abandoned ion-absorbed rare earth mine with a three-dimensional restoration technology as the core is adopted, so as to solve the problems of soil erosion and difficulty in survival of plants caused by rainstorm scouring in rainy seasons in South China. At the same time, the construction of ecological intercepting ditches on slopes and the introduction of rainwater into an ecological water-harvesting pond for secondary utilization can also prevent rainwater from bringing soil from mining areas into nearby surface water and polluting surface water.

The present invention provides a method for three-dimensional restoration of slope soil in an abandoned ion-absorbed rare earth mining area. The method provided by the present invention has high success rate of vegetation restoration, excellent effect, exquisite technical process design and simple construction and can obviously reduce the rate of soil erosion. Compared with similar methods, the method is lower in cost, attractive and safe and easy to popularize and apply, and has great application prospect and market demand. The method has a good ecological restoration effect on vegetation on slopes of abandoned ion-absorbed rare earth mining areas in the rainy areas in South China, and is suitable for the treatment of slopes of abandoned rare earth tailings mining areas in the rainy areas in South China.

Figure 1:
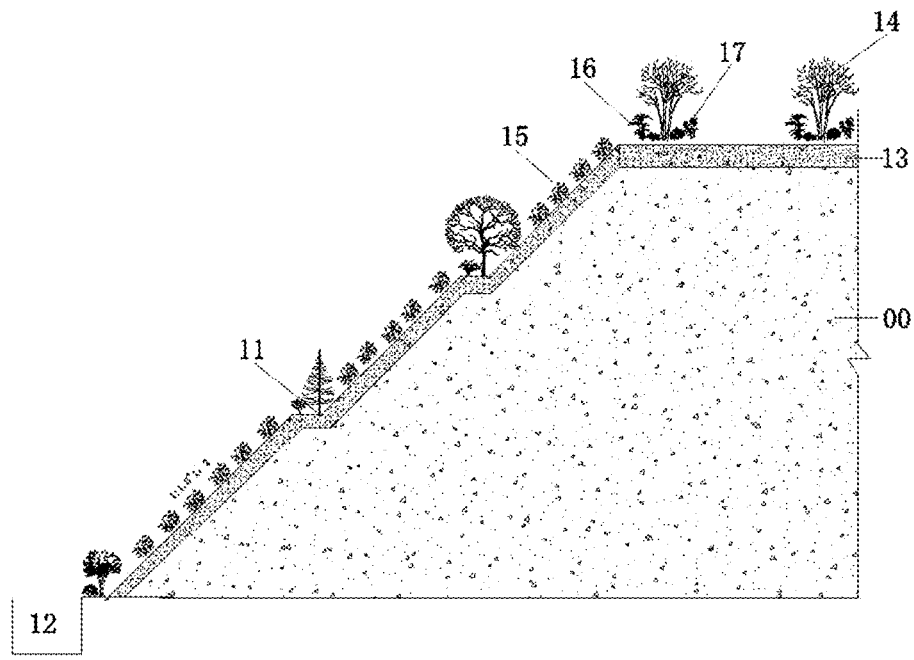
FIG. 1 is a schematic cross-sectional view of a structure for three-dimensional restoration of slope soil in an abandoned ion-absorbed rare earth mining area.

In the figure, 00. soil (soil of an abandoned ion-absorbed rare earth mining area), 10. soil restoration ecological network, 11. ecological intercepting ditch, 12. ecological water-harvesting pond, 13. modifier, 14. arbor, 15. vine, 16. shrub, 17. herb (tall herb+low herb), 18. fern, 19. bryophytes or edaphocyanophyceae.

DETAILED DESCRIPTION

The present invention provides a structure for three-dimensional restoration of slope soil in an abandoned ion-absorbed rare earth mining area, including an ecological water-harvesting pond, ecological intercepting ditches, an improved soil layer laid on the surface of a to-be-restored slope region and a soil restoration ecological network disposed on the improved soil layer;

the improved soil layer, the ecological water-harvesting pond and the ecological intercepting ditches are each provided with a combined plant synusia system;

the to-be-restored slope region is in a stair-step shape and includes a plurality of platform surfaces and a plurality of slope surfaces;

the ecological intercepting ditches each include a first slope surface ecological intercepting ditch, a second slope surface ecological intercepting ditch and a platform surface ecological intercepting ditch, where the first slope surface ecological intercepting ditch and the second slope surface ecological intercepting ditch are disposed on both sides of the slope surface respectively, the platform surface ecological intercepting ditches are disposed on an inner side and an outer side of the lowest platform surface close to a slope toe and inner sides of the remaining platform surfaces close to slope toes, both ends of the platform surface ecological intercepting ditch are connected to the first slope surface ecological intercepting ditch and the second slope surface ecological intercepting ditch respectively, and a bottom end of the first slope surface ecological intercepting ditch or the second slope surface ecological intercepting ditch is connected to the ecological water-harvesting pond.

In the present invention, the to-be-restored slope region is in a stair-step shape and includes a plurality of platform surfaces and a plurality of slope surfaces; a width of the platform surface is preferably 40-60 cm, more preferably 40-50 cm; an inward slope ratio of the platform surface is preferably 3%-8%, more preferably 5%; and a length of the slope surface is 2-3 m, more preferably 2-2.5 m. In the present invention, if the to-be-restored slope region does not meet the foregoing requirements, it is preferable to trim and then restore the to-be-restored slope region, and a specific trimming method is described in detail later.

The structure for three-dimensional restoration of slope soil in an abandoned ion-absorbed rare earth mining area provided by the present invention includes the improved soil layer laid on the surface of the to-be-restored slope region. In the present invention, a thickness of the improved soil layer is preferably 20-30 cm, and the improved soil layer is preferably obtained by improving a soil layer on the surface of the to-be-restored slope region by using a modifier. In the present invention, the modifier preferably specifically includes a THK-1 modifier, a THK-2 modifier, a THK-3 modifier, a THK-4 modifier and a THK-5 modifier, where the THK-1 modifier is preferably a modifier containing alkaline substances, more preferably calcium hydroxide powder, and the purity is preferably greater than 95%.

The THK-2 modifier is preferably a phosphate modifier, more preferably prepared by mixing hydroxyapatite with modified chitosan, and a ratio of the weight of the hydroxyapatite to the weight of the modified chitosan is preferably (180-220):1, more preferably 200:1. In this embodiment of the present invention, The AR purity of the hydroxyapatite is preferably greater than 99%, and the hydroxyapatite is specifically an analytical pure reagent produced by Xi'an Ruiying Biotechnology Co., Ltd. The viscosity of the modified chitosan is preferably greater than 400 mPa·s, and the modified chitosan is specifically produced by Chengdu Xiya Chemical Co., Ltd.

The THK-3 modifier is preferably a sulfide modifier and an organic acid modifier, and is more preferably prepared by mixing sodium sulfide and humic acid, and a ratio of the weight of the sodium sulfide to the weight of the humic acid is preferably 100:(1.4-1.8), more preferably 100:1.6. In this embodiment of the present invention, the AR purity of the sodium sulfide ($Na_2S \cdot 9H_2O$) is preferably not less than 98%, and the sodium sulfide is specifically an analytical pure reagent produced by Tianjin Fengchuan Chemical Reagent Technologies Co., Ltd. The AR purity of the humic acid is preferably greater than 85%, and the humic acid is specifically an analytical pure reagent produced by Wuhai Hongli Chemical Plant in Inner Mongolia.

The THK-4 modifier is preferably a composite modifier containing carbon/silicon/phosphorus, and is more preferably prepared by mixing and grinding low-temperature treated crop straws and dried chicken manure according to a weight ratio of 1:(0.8-1.2) and sieving with an 80-mesh sieve, where the low-temperature treated crop straws are specifically prepared by treating crop straw raw materials around Nanchang in Jiangxi Province for 2-3 h at 380-420° C.; and the dried chicken manure is specifically prepared by drying chicken manure raw materials of large-scale chicken farms at 90-95° C.

The THK-5 type modifier is preferably a biomass carbon modifier. Specifically, grapefruit grown around Nanchang in Jiangxi Province is peeled and cored, the obtained grapefruit peel is sequentially cleaned, dried and ground to obtain grapefruit peel powder, the grapefruit peel powder is treated for 4-6 h at 280-320° C. to obtain a biomass carbon coarse material, and the biomass carbon coarse material is ground and sieved through a 200-mesh sieve to obtain the biomass carbon modifier.

The structure for three-dimensional restoration of slope soil in an abandoned ion-absorbed rare earth mining area provided by the present invention includes the soil restoration ecological network embedded in the improved soil layer. In the present invention, the soil restoration ecological network is preferably composed of biological soil-fixing materials prepared from agricultural wastes. In the present invention, no special restriction is imposed on the source of the biological soil-fixing materials, and it is sufficient to refer to a biological soil-fixing material disclosed in the patent (authorization number: ZL 201720185638.6) of the research team.

In an embodiment of the present invention, the soil restoration ecological network is composed of a plurality of soil-fixing devices, the soil-fixing devices are rectangular frames, and a width of each frame is preferably 3-8 cm.

In an embodiment of the present invention, the rectangular frames with different shapes and sizes are disposed on the platform surfaces and the slope surfaces to form a soil restoration ecological network. Specifically, a rectangular frame-shaped soil-fixing device is arranged on each stage of platform surface along the periphery of the platform surface (the side length of the rectangular frame is matched with the size of each stage of platform surface, the width is preferably 30-50 cm, and the length is preferably determined according to the specific terrain; the width of each frame is preferably 3-5 cm), and a plurality of square frame-shaped soil-fixing devices are arranged on each stage of slope surface (the side length of the square frame is preferably 60 cm, and the width of each frame is preferably 6-8 cm). In the present invention, the rectangular frame-shaped soil-fixing devices on the platform surfaces and the square frame-shaped soil-fixing device on the slope surfaces respectively form a soil restoration ecological network so as to realize classified soil fixation of the slope of the abandoned ion-absorbed rare earth mining area.

In an embodiment of the present invention, ¾ of the soil restoration ecological network is embedded in the improved soil layer, that is, ¼ is exposed on the surface of the improved soil layer, thus ensuring better soil fixation and erosion prevention effects.

The structure for three-dimensional restoration of slope soil of an abandoned ion-absorbed rare earth mining area provided by the present invention includes an ecological water-harvesting pond and ecological intercepting ditches, where the ecological intercepting ditches each include a first slope surface ecological intercepting ditch, a second slope surface ecological intercepting ditch and a platform surface ecological intercepting ditch, where the first slope surface ecological intercepting ditch and the second slope surface ecological intercepting ditch are disposed on both sides of the slope surface respectively, the platform surface ecological intercepting ditches are disposed on an inner side and an outer side of the lowest platform surface close to a slope toe and inner sides of the remaining platform surfaces close to slope toes, both ends of the platform surface ecological intercepting ditch are connected to the first slope surface ecological intercepting ditch and the second slope surface ecological intercepting ditch respectively, and a bottom end of the first slope surface ecological intercepting ditch or the second slope surface ecological intercepting ditch is connected to the ecological water-harvesting pond. In the present invention, widths of the first slope surface ecological intercepting ditch and the second slope surface ecological intercepting ditch are each preferably 18-22 cm, more preferably 20 cm, and depths of the first slope surface ecological intercepting ditch and the second slope surface ecological intercepting ditch are each preferably 28-32 cm, more preferably 30 cm; a width of the platform surface ecological intercepting ditch is preferably 6-8 cm, more preferably 7 cm, and a depth of the platform surface ecological intercepting ditch is preferably 28-32 cm, more preferably 30 cm. In the present invention, a longitudinal gradient in the ecological intercepting ditch is preferably 1.3%.

In the present invention, the ecological water-harvesting pond is preferably disposed in an area other than the to-be-restored slope region. In the present invention, no special limitation is imposed on a specific arrangement position of the ecological water-harvesting pond. In the present invention, no special limitation is imposed on the size of the ecological water-harvesting pond, and it is preferable to select an ecological water-harvesting pond with an appropriate size according to the to-be-restored slope region.

In the structure for three-dimensional restoration of slope soil of an abandoned ion-absorbed rare earth mining area provided by the present invention, the improved soil layer, the ecological water-harvesting pond and the ecological intercepting ditches are each provided with a combined plant synusia system; the combined plant synusia system preferably includes a slope surface combined plant synusia system, a platform surface combined plant synusia system, an ecological intercepting ditch combined plant synusia system and an ecological water-harvesting pond combined plant synusia system; the combined plant synusia system disposed on the improved soil layer is the slope surface combined plant synusia system and the platform surface combined plant synusia system and is specifically disposed on the improved soil layer in a rectangular frame-shaped soil-fixing device of the soil restoration ecological network.

In the present invention, the slope surface combined plant synusia system preferably adopts an arbor-vine-shrub-herb combined synusia system. Specifically, the arbors preferably adopt *Phyllostachys pubescens* and *Rhus chinensis*, and the planting density is preferably 1-2 plants/4 m². The vines preferably adopt *Trachelospermum* and kudzu, and the planting density is preferably 2-3 plants/m². The shrubs preferably adopt bamboo and *Camellia*, and the planting density is preferably 5-8 plants/m². The herbs preferably include tall herbs and low herbs, where the tall herbs preferably adopt awn and burma reed, the planting density is preferably 1-3 rows/m², and each row preferably has 3-5 plants. The low herbs preferably adopt broadleaf *Paspalum* and bermudagrass, the planting density is preferably 4-6 rows/m², and each row preferably has 10-15 plants.

In the present invention, the platform surface combined plant synusia system preferably adopts an arbor-shrub-herb combined synusia system. Specifically, the arbors preferably adopt cypress and pine trees, and the planting density is preferably 1-2 plants/4 m². The shrubs preferably adopt Chinese hibiscus and *Duranta repens*, and the planting density is preferably 5-8 plants/m². The herbs preferably include tall herbs and low herbs, where the tall herbs preferably adopt awn and burma reed, the planting density is preferably 1-2 rows/m², and each row preferably has 3-5 plants. The low herbs preferably adopt broadleaf *Paspalum* and bermudagrass, the planting density is preferably 2-5 rows/m², and each row preferably has 10-15 plants.

In the present invention, the ecological intercepting ditch combined plant synusia system preferably adopts an algae-moss-fern combined lamella system. Specifically, the algae preferably adopts native edaphocyanophyceae, the moss preferably adopts bryophytes, the fern preferably adopts *Dicranopteris pedata* and/or *Pteris multifida*, and the planting density is preferably 25-35 plants/m².

In the present invention, the ecological water-harvesting pond combined plant synusia system preferably adopts an oxidation pond aquatic plant system. In the present invention, no special limitation is imposed on the specific aquatic plant species of the oxidation pond aquatic plant system, and it is sufficient to use aquatic plants well known to those skilled in the art. In this embodiment of the present invention, an ecological water-harvesting pond aquatic plant system is specifically configured by a method disclosed in the inventor's earlier patent CN102432108.

The present invention provides a method for three-dimensional restoration of slope soil in an abandoned ion-absorbed rare earth mining area, including the following steps of:

trimming a to-be-restored slope region into a stair-step shape with a plurality of platform surfaces and a plurality of slope surfaces, where both sides of each slope surface are provided with a first slope surface ecological intercepting ditch and a second slope surface ecological intercepting ditch respectively, platform surface ecological intercepting ditches are disposed on an inner side and an outer side of the lowest platform surface close to a slope toe and inner sides of the remaining platform surfaces close to slope toes, both ends of the platform surface ecological intercepting ditch are connected to the first slope surface ecological intercepting ditch and the second slope surface ecological intercepting ditch respectively, and a bottom end of the first slope surface ecological intercepting ditch or the second slope surface ecological intercepting ditch is connected to the ecological water-harvesting pond;

laying an improved soil layer on the surface of the to-be-restored slope region and arranging a soil restoration ecological network on the improved soil layer; and planting plants in the ecological water-harvesting pond, the ecological intercepting ditches and the improved soil layer to form a combined plant synusia system.

In the present invention, a to-be-restored slope region is trimmed into a stair-step shape with a plurality of platform surfaces and a plurality of slope surfaces, where both sides of each slope surface are provided with a first slope surface ecological intercepting ditch and a second slope surface ecological intercepting ditch respectively, platform surface ecological intercepting ditches are disposed on an inner side and an outer side of the lowest platform surface close to a slope toe and inner sides of the remaining platform surfaces close to slope toes, both ends of the platform surface ecological intercepting ditch are connected to the first slope surface ecological intercepting ditch and the second slope surface ecological intercepting ditch respectively, and a bottom end of the first slope surface ecological intercepting ditch or the second slope surface ecological intercepting ditch is connected to the ecological water-harvesting pond. In the present invention, no special limitation is imposed on the specific mode of trimming, as long as a platform surface and a slope surface with required sizes can be obtained. In this embodiment of the present invention, specifically, according to the terrain and environment of the to-be-restored slope region in the abandoned ion-absorbed rare earth mining area, the slope with a gradient greater than 45° and a slope length greater than 3 m is subjected to stepped slope cutting, and the slope is trimmed according to a slope setting rate of 1:(1.5-2.0). Each stage of platform surface maintains an inward slope ratio of 4-6%, the platform surface is set to be 40-60 cm wide, and each stage of slope surface is 2-3 m long. The principle of "digging high and filling low" is followed in determining an earthwork allocation solution. Then, the soil on the slope of the abandoned ion-absorbed rare earth mining area to be restored is crushed to ensure that the diameter of the crushed soil is less than 1 cm and is leveled.

In the present invention, a method of layout of the ecological intercepting ditch and the ecological water-harvesting pond is not particularly limited, and the ecological intercepting ditch and the ecological water-harvesting pond can be newly built or rebuilt according to the terrain and topography of the to-be-restored slope region with reference to the current situation of existing ditches in the to-be-restored slope region.

In the present invention, an improved soil layer is laid on the surface of the to-be-restored slope region and a soil restoration ecological network is embedded in the improved soil layer. In the present invention, a method for laying the improved soil layer preferably includes sequentially uniformly applying a THK-1 modifier, a THK-2 modifier, a THK-3 modifier, a THK-4 modifier and a THK-5 modifier to platform surfaces and slope surfaces of a to-be-restored slope region; plowing with a rotary cultivator after each application of the modifier, where a plowing depth is 20-30 cm; and the soil dryness needs to be controlled to be 80% or more during plowing; the specific application amount of each modifier is not specifically limited, and the application amount can be determined according to the actual situation of soil.

In the present invention, a certain amount of surface fresh water is preferably scattered after the last plowing to ensure that the water content of soil reaches 50%-60% of the field water holding capacity; then the slope surface and the platform surface are covered with a layer of dark nylon net for soil shading to prevent evaporation of a large amount of water; the obtained improved soil layer is sampled for analysis of relevant soil indexes; and according to the actual situation of the soil, it is determined whether a certain amount of organic fertilizer (such as Huajing organic fertilizer) should be applied to the soil or a further modifier should be applied to make the soil gradually restore its original function.

In the present invention, preferably a soil restoration ecological network is embedded in an improved soil layer according to a series of operation processes of "digging-embedding-fixing-filling". Specifically, corresponding ditches are manually excavated on the soil surface of abandoned rare earth mines according to the sizes of soil-fixing devices; then the soil-fixing devices are fixed in an embedded mode in the ditches, a fixed area is sequentially expanded according to a #-shaped module, and the excavated soil is backfilled, so that it is ensured that ¾ of each soil-fixing device is buried in the soil.

In the present invention, plants are planted in the ecological water-harvesting pond, the ecological intercepting ditches and the improved soil layer to form a combined plant synusia. Planting plants in the improved soil layer is preferably planting plants in the improved soil layer in the rectangular frame of the soil restoration ecological network, more preferably setting fish scale holes in the rectangular frame, applying organic fertilizer in the fish scale holes, specifically applying fertilizer according to the degree of poor soil in the soil fertility classification standard (namely the fertility standard with organic matter content reaching 0.6-1.0%), then planting plants, and spraying a certain amount of water to maintain the relative stability of field water holding capacity. A specific method for planting each plant is not particularly limited in the present invention, and according to the characteristics of specific plant species required for the foregoing technical solution, planting may be performed by using methods well known to those skilled in the art.

In the present invention, after planting plants in the improved soil layer, preferably the method further includes field moisture and fertilization management. In the present invention, no special limitation is imposed on specific operations of the field moisture and fertilization management, and methods well known to those skilled in the art may be adopted. For example, watering may be performed 2-6 times and topdressing may be performed once (topdressing is performed according to 1/10 of the amount of base fertilizer). After the plants grow for 60-180 days, the plants are harvested and dried in the sun and then relevant indexes are determined. The plants can be used as livestock feed if they meet the GB 13078 Feed Hygiene Standard, and if the plants do not meet relevant standards, they are transferred and subjected to centralized incineration for harmless treatment.

The technical solution in the present invention is clearly and completely described below in conjunction with the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Embodiment 1

Figure 2:
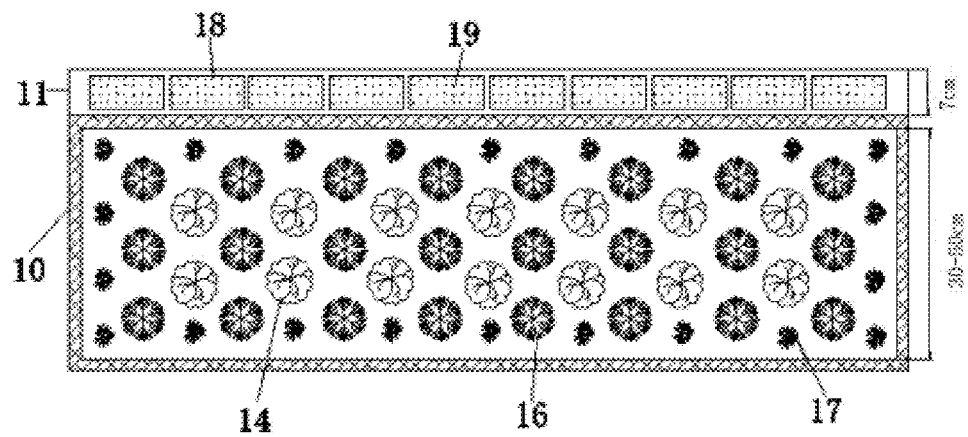
FIG. 2 is a schematic plan view (top view) of a platform surface.
Figure 3:
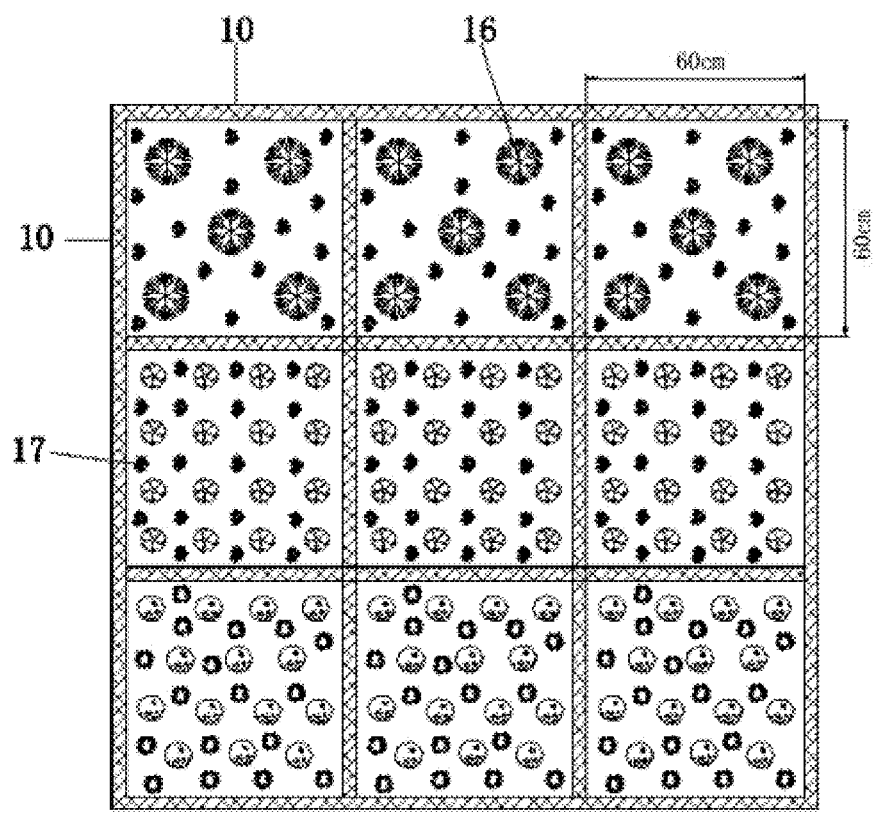
FIG. 3 is a schematic structural view (top view) of a slope surface.
Figure 4:
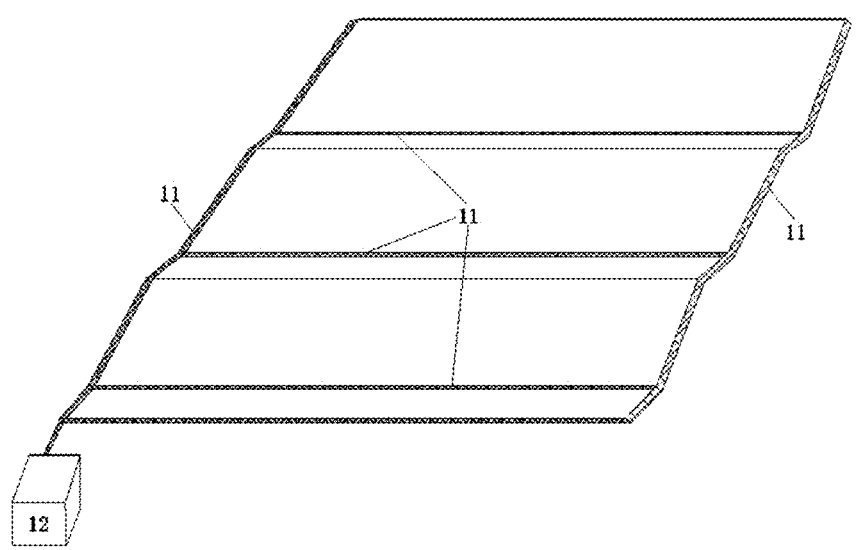
FIG. 4 is a schematic plan view (front view) of an ecological intercepting ditch.

Referring to FIGS. 1 to 4, a structure for three-dimensional restoration of slope soil in an abandoned ion-absorbed rare earth mining area specifically includes the following steps:

1. Slope Surface Trimming

According to the terrain and environment of a to-be-restored slope region in the abandoned ion-absorbed rare earth mining area, the slope with a gradient greater than 45° and a slope length greater than 3 m is subjected to stepped slope cutting, and the slope is trimmed according to a slope setting rate of 1:(1.5-2.0). Each stage of platform surface maintains an inward slope ratio of about 5%, the platform surface is set to be 40-60 cm wide, and each stage of slope surface is 2-3 m long. The principle of "digging high and filling low" is followed in determining an earthwork allocation solution. Then, the soil on the slope of the abandoned ion-absorbed rare earth mining area to be restored is crushed to ensure that the diameter of the crushed soil is less than 1 cm and is leveled.

2. Layout of Ecological Intercepting Ditches and an Ecological Water-Harvesting Pond According to the terrain and topography of the to-be-restored slope region, the ecological intercepting ditches and the ecological water-harvesting pond can be rebuilt with reference to the current situation of existing ditches in the to-be-restored slope region. The ecological intercepting ditches disposed on both sides of the slope surface are a first slope surface ecological intercepting ditch and a second slope surface ecological intercepting ditch respectively, and ecological intercepting ditches disposed on the platform surfaces (on an inner side and an outer side of the lowest platform surface close to a slope toe and inner sides of the remaining platform surfaces close to slope toes) are platform surface ecological intercepting ditches. Both ends of the platform surface ecological intercepting ditch are connected to the first slope surface ecological intercepting ditch and the second slope surface ecological intercepting ditch respectively, and a bottom end of the first slope surface ecological intercepting ditch or the second slope surface ecological intercepting ditch is connected to the ecological water-harvesting pond. The first slope surface ecological intercepting ditch and the second slope surface ecological intercepting ditch have widths of 20 cm and depth of 30 cm. The platform surface ecological intercepting ditch has a width of 7 cm and a depth of 20 cm. A longitudinal gradient in the ecological intercepting ditch is 1.3%.

3. Soil Improvement

A THK-1 modifier, a THK-2 modifier, a THK-3 modifier, a THK-4 modifier and a THK-5 modifier are sequentially applied to platform surfaces and slope surfaces of a to-be-restored slope region; plowing is performed with a rotary cultivator after each application of the modifier, where a plowing depth is 20-30 cm; and the soil dryness needs to be controlled to be 80% or more during plowing, where the THK-1 modifier is calcium hydroxide powder, and the purity is greater than 95%.

The THK-2 modifier is prepared by mixing hydroxyapatite with modified chitosan at a weight ratio of 200:1. The AR purity of the hydroxyapatite is greater than 99%, and the hydroxyapatite is an analytical pure reagent produced by Xi'an Ruiying Biotechnology Co., Ltd. The viscosity of the modified chitosan is greater than 400 mPa·s, and the modified chitosan is produced by Chengdu Xiya Chemical Co., Ltd.

The THK-3 modifier is prepared by mixing sodium sulfide and humic acid at a weight ratio of 100:1.6. The AR purity of the sodium sulfide ($Na_2S \cdot 9H_2O$) is preferably not less than 98%, and the sodium sulfide is an analytical pure reagent produced by Tianjin Fengchuan Chemical Reagent Technologies Co., Ltd. The AR purity of the humic acid is greater than 85%, and the humic acid is an analytical pure reagent produced by Wuhai Hongli Chemical Plant in Inner Mongolia.

The THK-4 modifier is prepared by mixing and grinding low-temperature treated crop straws and dried chicken manure at a weight ratio of 1:1 and sieving with an 80-mesh sieve, where the low-temperature treated crop straws are prepared by treating crop straw raw materials around Nanchang in Jiangxi Province for 2.5 h at 400° C.; and the dried chicken manure is prepared by drying chicken manure raw materials of large-scale chicken farms at 95° C.

The THK-5 type modifier is a biomass carbon modifier. Specifically, grapefruit (*Citrus grandis*) grown around Nanchang in Jiangxi Province is peeled and cored, the obtained grapefruit peel is sequentially cleaned, dried and ground to obtain grapefruit peel powder, the grapefruit peel powder is treated for 5 h at 300° C. to obtain a biomass carbon coarse material, and the biomass carbon coarse material is ground and sieved through a 200-mesh sieve to obtain the biomass carbon modifier.

A certain amount of surface fresh water is scattered after the last plowing to ensure that the water content of soil reaches 50%-60% of the field water holding capacity; then the slope surface and the platform surface are covered with a layer of dark nylon net for soil shading to prevent evaporation of a large amount of water; the obtained improved soil layer is sampled for analysis of relevant soil indexes; and according to the actual situation of the soil, it is determined whether a certain amount of organic fertilizer (such as Huajing organic fertilizer) should be applied to the soil or a further modifier should be applied to make the soil gradually restore its original function.

4. Slope Surface Protection

Embedding a soil restoration ecological network in an improved soil layer on the platform surfaces and the slope surfaces according to a series of operation processes of "digging-embedding-fixing-filling" specifically includes manually digging corresponding ditches on the soil surface of the abandoned rare earth mine according to the sizes of soil-fixing devices; then fixing the soil-fixing devices in an embedded mode in the ditches, sequentially expanding a fixed area according to a #-shaped module, backfilling the excavated soil, so that it is ensured that 3/4 of each soil-fixing device needs to be buried in the soil, where a rectangular frame-shaped soil-fixing device is arranged on each stage of platform surface along the periphery of the platform surface (the width of the rectangular frame is 30-50 cm, and the width of each frame is preferably 5 cm), and a plurality of square frame-shaped soil-fixing devices are arranged on each stage of slope surface (the side length of the square frame is 60 cm, and the width of each frame is 8 cm). The rectangular frame-shaped soil-fixing devices on the platform surfaces and the square frame-shaped soil-fixing device on the slope surfaces respectively form a soil restoration ecological network.

5. Plant Configuration

1) Slope surface plant configuration: an arbor-vine-shrub-herb combined synusia system is adopted. The arbors specifically adopt *Phyllostachys pubescens* and *Rhus chinensis*, and the planting density is 1-2 plants/4 m$^2$. The vines specifically adopt *Trachelospermum* and kudzu, and the planting density is 2-3 plants/m$^2$. The shrubs specifically adopt bamboo and *Camellia*, and the planting density is 5-8 plants/m$^2$. The herbs include tall herbs and low herbs, where the tall herbs specifically adopt awn and burma reed, the planting density is specifically 1-3 rows/m$^2$, and each row has 3-5 plants. The low herbs specifically adopt broadleaf *Paspalum* and bermudagrass, the planting density is 4-6 rows/m$^2$, and each row has 10-15 plants.

2) Platform surface plant configuration: arbor-shrub-herb combined synusia system is adopted. The arbors specifically adopt cypress and pine trees, and the planting density is 1-2 plants/4 m$^2$. The shrubs specifically adopt Chinese hibiscus and *Duranta repens*, and the planting density is 5-8 plants/m$^2$. The herbs include tall herbs and low herbs, where the tall herbs specifically adopt awn and burma reed, the planting density is 1-2 rows/m$^2$, and each row has 3-5 plants. The low herbs specifically adopt broadleaf *Paspalum* and bermudagrass, the planting density is 2-5 rows/m$^2$, and each row has 10-15 plants.

3) Ecological intercepting ditch plant configuration: An algae-moss-fern combined lamella system is adopted; specifically, native edaphocyanophyceae, bryophytes and *Pteris multifida* are adopted, and the planting density is 25-35 plants/m$^2$.

4) Ecological water-harvesting pond plant configuration: Ecological water-harvesting pond plants are configured according to the aquatic plant planting method of a biological pond, specifically, the method disclosed in the patent CN102432108 is adopted to configure the ecological water-harvesting pond aquatic plant system.

(5) Planting plants on the slope surfaces and the platform surfaces specifically includes setting fish scale holes in the square frame and the rectangular frame respectively, applying organic fertilizer in the fish scale holes, specifically applying fertilizer according to the degree of poor soil in the soil fertility classification standard (namely the fertility standard with organic matter content reaching 0.6-1.0%), then planting plants, and spraying a certain amount of water to maintain the relative stability of field water holding capacity. After the plants are planted, normal field moisture and fertilization management is performed. After the plants grow for 60-180 days, the plants are harvested and dried in the sun and then relevant indexes are determined. The plants can be used as livestock feed if they meet the GB 13078 Feed Hygiene Standard, and if the plants do not meet relevant standards, they are transferred and subjected to centralized incineration for harmless treatment.

The foregoing descriptions are only preferred embodiments of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. A structure for three-dimensional restoration of slope soil in an abandoned ion-absorbed rare earth mining area, comprising an ecological water-harvesting pond, ecological intercepting ditches, an improved soil layer laid on the surface of a to-be-restored slope region and a soil restoration ecological network embedded in the improved soil layer;

the improved soil layer, the ecological water-harvesting pond and the ecological intercepting ditches are each provided with a combined plant synusia system;

the to-be-restored slope region is in a stair-step shape and comprises a plurality of platform surfaces and a plurality of slope surfaces;

the ecological intercepting ditches each comprise a first slope surface ecological intercepting ditch, a second slope surface ecological intercepting ditch and a platform surface ecological intercepting ditch, wherein the first slope surface ecological intercepting ditch and the second slope surface ecological intercepting ditch are disposed on both sides of the slope surface respectively, the platform surface ecological intercepting ditches are disposed on an inner side and an outer side of the lowest platform surface close to a slope toe and inner sides of the remaining platform surfaces close to slope toes, both ends of the platform surface ecological intercepting ditch are connected to the first slope surface ecological intercepting ditch and the second slope surface ecological intercepting ditch respectively, and a bottom end of the first slope surface ecological intercepting ditch or the second slope surface ecological intercepting ditch is connected to the ecological water-harvesting pond.

2. The structure for three-dimensional restoration of slope soil in an abandoned ion-absorbed rare earth mining area according to claim 1, wherein the platform surface has a width of 40-60 cm and an inward slope ratio of 3%-8%; and the slope surface has a length of 2-3 m.

3. The structure for three-dimensional restoration of slope soil in an abandoned ion-absorbed rare earth mining area according to claim 2, wherein the soil restoration ecological network is composed of a plurality of soil-fixing devices, the soil-fixing devices are rectangular frames, and a width of each frame is 3-8 cm; and the soil restoration ecological network is formed by biological soil fixing materials prepared from agricultural wastes.

4. The structure for three-dimensional restoration of slope soil in an abandoned ion-absorbed rare earth mining area according to claim 1, wherein the soil restoration ecological network is composed of a plurality of soil-fixing devices, the soil-fixing devices are rectangular frames, and a width of each frame is 3-8 cm; and the soil restoration ecological network is formed by biological soil fixing materials prepared from agricultural wastes.

5. The structure for three-dimensional restoration of slope soil in an abandoned ion-absorbed rare earth mining area according to claim 1, wherein the improved soil layer has a thickness of 20-30 cm.

6. The structure for three-dimensional restoration of slope soil in an abandoned ion-absorbed rare earth mining area according to claim 5, wherein the improved soil layer is obtained by improving a soil layer on the surface of the to-be-restored slope region by using a modifier.

7. The structure for three-dimensional restoration of slope soil in an abandoned ion-absorbed rare earth mining area according to claim 1, wherein the improved soil layer is obtained by improving a soil layer on the surface of the to-be-restored slope region by using a modifier.

8. The structure for three-dimensional restoration of slope soil in an abandoned ion-absorbed rare earth mining area according to claim 1, wherein the combined plant synusia system comprises a slope surface combined plant synusia system, a platform surface combined plant synusia system, an ecological intercepting ditch combined plant synusia system and an ecological water-harvesting pond combined plant synusia system.

9. The structure for three-dimensional restoration of slope soil in an abandoned ion-absorbed rare earth mining area according to claim 8, wherein the slope surface combined plant synusia system adopts an arbor-vine-shrub-herb combined synusia system, the platform surface combined plant synusia system adopts an arbor-shrub-herb combined synusia system, the ecological intercepting ditch combined plant synusia system adopts an algae-moss-fern combined synusia system, and the ecological water-harvesting pond combined plant synusia system adopts an oxidation pond aquatic plant system.

10. The structure for three-dimensional restoration of slope soil in an abandoned ion-absorbed rare earth mining area according to claim 1, wherein the first slope surface ecological intercepting ditch and the second slope surface ecological intercepting ditch each have a width of 18-22 cm and a depth of 28-32 cm; and the platform surface ecological intercepting ditch has a width of 6-8 cm and a depth of 28-32 cm.

11. A method for three-dimensional restoration of slope soil in an abandoned ion-absorbed rare earth mining area, comprising the following steps of:
trimming a to-be-restored slope region into a stair-step shape with a plurality of platform surfaces and a plurality of slope surfaces, wherein both sides of each slope surface are provided with a first slope surface ecological intercepting ditch and a second slope surface ecological intercepting ditch respectively, platform surface ecological intercepting ditches are disposed on an inner side and an outer side of the lowest platform surface close to a slope toe and inner sides of the remaining platform surfaces close to slope toes, both ends of the platform surface ecological intercepting ditch are connected to the first slope surface ecological intercepting ditch and the second slope surface ecological intercepting ditch respectively, and a bottom end of the first slope surface ecological intercepting ditch or the second slope surface ecological intercepting ditch is connected to the ecological water-harvesting pond;
laying an improved soil layer on the surface of the to-be-restored slope region and embedding a soil restoration ecological network in the improved soil layer; and
planting plants in the ecological water-harvesting pond, the ecological intercepting ditches and the improved soil layer to form a combined plant synusia system.

12. The method for three-dimensional restoration of slope soil in an abandoned ion-absorbed rare earth mining area according to claim 11, wherein after the planting plants in the improved soil layer, the method further comprises field moisture and fertilization management.

\* \* \* \* \*